R. N. WOOD.
AIR LIFT.
APPLICATION FILED SEPT. 1, 1908.

932,934.

Patented Aug. 31, 1909.

WITNESSES
F. E. Maynard

INVENTOR:
Robert N. Wood:
BY Geo. H. Strong
ATTORNEY

UNITED STATES PATENT OFFICE.

ROBERT N. WOOD, OF POINT RICHMOND, CALIFORNIA, ASSIGNOR TO ERNEST R. SMITH, OF PALO ALTO, CALIFORNIA.

AIR-LIFT.

932,934.

Specification of Letters Patent. Patented Aug. 31, 1909.

Application filed September 1, 1908. Serial No. 451,157.

*To all whom it may concern:*

Be it known that I, ROBERT N. WOOD, a citizen of the United States, residing at Point Richmond, in the county of Contra Costa and State of California, have invented new and useful Improvements in Air-Lifts, of which the following is a specification.

My invention relates to a means for raising water in wells, and for like or equivalent purposes, such means being known as "air lifts."

It consists in the combination of parts, and in details of construction which will be more fully explained by reference to the accompanying drawings, in which—

Figure 1:
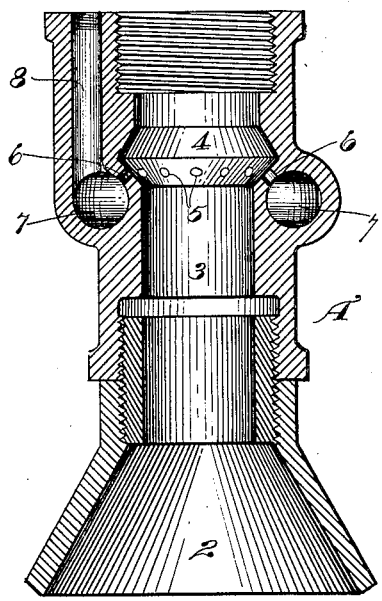
Figure 3:
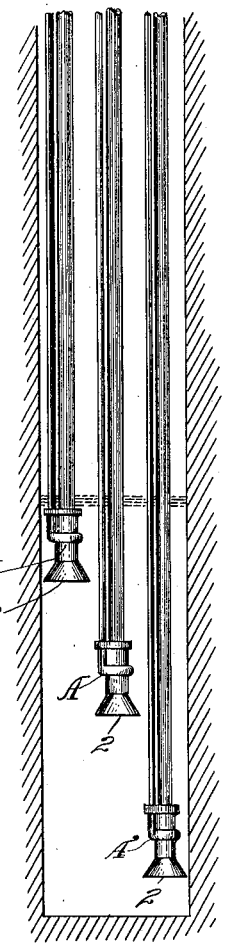
Figure 2:
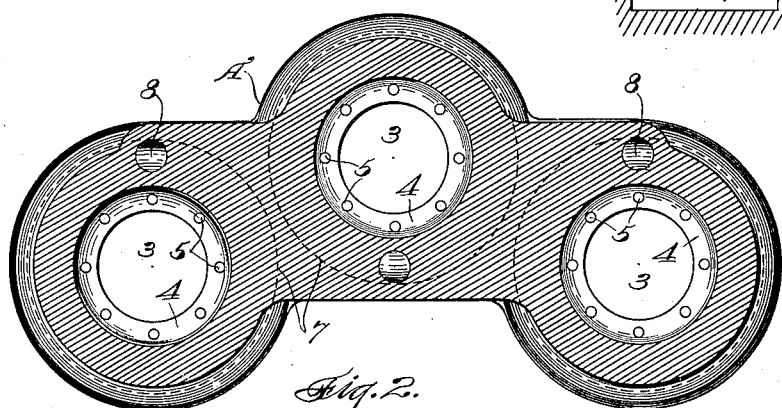

Figure 1 is a vertical enlarged section of the apparatus. Fig. 2 is a transverse section, showing a plurality of the lifts. Fig. 3 is a vertical section of the well, showing lifting units arranged serially.

It is the object of my invention to provide a more efficient means of introducing air for lifting liquid in deep wells; means for releasing the air into the whole chamber or core, whereby a higher efficiency is provided, and back pressure upon the liquid is prevented.

As shown in the drawing, the device consists of a casting or foot-piece A with which the inlet and discharge pipes are connected by nipples, or in other suitable manner.

The lower or inlet tail-piece 2 is preferably made bell-shaped, converging from below upwardly. The foot-piece A has the passage 3 made through it, and 4 is an enlarged section having its greatest diameter on a substantially central, horizontal plane, and converging in both directions to the diameter of the passage above and below. Through the lower inclined surface of this enlarged channel, a series of holes 5 are made; these openings connecting through passages 6 with an annular air passage 7 which is formed around the outer portion of the part A, and which is supplied with air from a suitable compressor through the passage 8. The air is distributed from this passage around the annular channel 7, and is delivered thence through the annular passages 6, and the openings 5 toward the center of the water passage. The angle of these passages 6 may operatively be about 45 degrees, more or less. The result will be that the jets of air are introduced from all points around the circumference of the pipe, and directed upwardly and toward the center and sides. The air is thus thoroughly and evenly distributed through the body of liquid, and by reason of the form of the chamber, and its inlets, back or downward pressure upon the incoming liquid is prevented, and the efficiency of the apparatus is greatly increased. The air thus introduced is given a uniform and even distribution, and is allowed to expand evenly and properly, thus lifting the liquid by its expansive force, and this even distribution of the air is an important feature of my invention, in conjunction with the prevention of back pressure.

In order to increase the efficiency of the apparatus, I may provide two or more similar lifts operating in conjunction, the arrangement of these being well shown in the horizontal section, Fig. 2.

In some cases, it will be found desirable to arrange the lifting units in tandem, one above the other, each one operating independently, but the lifting effect of each reduces the downward pressure caused by the weight of the liquid above; thus the first one will permeate the body of liquid with the air, and the lifting of this body reduces the pressure so that the subsequent ones will have less pressure to overcome in their initial action.

The device is also very serviceable, because if the liquid should lower in the well, lower lifts can be operated independently, and the upper ones remain inactive.

The even distribution of the air through the body of liquid and around the sides of the pipe, materially overcomes and reduces the loss by friction, and what is known as slippage, which occurs when the air is introduced in large and intermittent volumes. The flow of liquid through the ejection pipe, is ordinarily more rapid in the center of the column by reason of the side friction, but my device overcomes this in a large measure, and increases the volume and regularity of the flow.

The interior of the foot-piece may be made perfectly smooth and straight to coincide with the ejection pipe.

Having thus described my invention, what I claim and desire to secure by Letters Patent is—

1. In an air lift for liquids, a body or foot-piece having a conducting passage there-through, a surrounding channel of larger diameter converging upwardly and downwardly from its largest diameter, and integral with the liquid passage, an independent air channel formed in the body of the foot-piece, and passages opening directly from said air-channel into the lower beveled portion of the interior channel, said passages converging toward the center of the conducting pipe.

2. In an air lift for liquids, a foot-piece having a vertical centrally disposed passage, horizontal V-shaped enlargement formed in said passage, an annular tubular channel formed in the foot-piece below the enlargement, means for supplying said channel with air under pressure, and passages extending from said air passage into the interior enlargement, said passages converging upwardly.

3. In an air lift apparatus for liquids, a foot-piece having a centrally disposed vertical passage, an annular enlargement, the surfaces of which converge upwardly and downwardly to meet the contiguous ends of the liquid-passage, openings formed in the lower inclined surface of said channel, an annular air supply surrounding the said enlargement having upwardly convergent connections with the openings of the annular channel whereby the air is delivered upwardly, the lower surface of said channel acting to prevent back pressure upon the liquid.

4. In an air lift for liquids, a foot-piece having a vertical central passage, an enlarged V-shaped channel converging upwardly and downwardly from its largest diameter to a junction with the contiguous ends of the vertical passage, an annular air-passage surrounding the lower part of said channel having openings converging upwardly through the lower portion of the interior channel, and a bell-shaped or convergent tail-piece connecting with the lower end of said device.

5. An air lift for liquid, said lift comprising a plurality of vertical passages, each having an annular enlarged channel convergent from its largest diameter to meet the contiguous edges of the liquid passage, and annular exterior channels, with means for supplying air under pressure thereto, and upwardly convergent passages connecting said air passages with the lower surfaces of the interior channel.

6. In an air lift for liquid, a series of independent conducting pipes, each having a foot piece with a vertical centrally disposed passage, a horizontal V-shaped enlargement formed in said passage, an annular tubular channel formed in the foot piece below said enlargement, and means for introducing air under pressure into said channel, said pipes being arranged one above the other, and having downwardly divergent suction passages.

7. In an air lift for liquids, a vertical conducting pipe having an annular enlargement forming a shoulder or bench, an inclosed annular passage surrounding the pipe below the bench, an air supply passage opening into the annular passage, and openings converging inwardly and upwardly from said passage through the bench.

In testimony whereof I have hereunto set my hand in presence of two subscribing witnesses.

ROBERT N. WOOD.

Witnesses:
W. D. BOSWELL.
J. H. GREGORY.